United States Patent [19]
Hidetsugu et al.

[11] Patent Number: 5,366,038

[45] Date of Patent: Nov. 22, 1994

[54] ROBOT TRAVELING ON WALL FACE

[75] Inventors: Nishiguchi Hidetsugu, 22-28, Kawasaki 2 chome, Ise-shi, Mie, Japan; Nishiguchi Kenji, Taki, Japan

[73] Assignee: Nishiguchi Hidetsugu, Mie, Japan

[21] Appl. No.: 80,948

[22] Filed: Jun. 24, 1993

[30] Foreign Application Priority Data

Aug. 25, 1992 [JP] Japan .................................. 4-250816
Dec. 22, 1992 [JP] Japan .................................. 4-356852

[51] Int. Cl.$^5$ ...................... B60B 39/00; B62D 55/07
[52] U.S. Cl. ..................................... 180/164; 180/7.1; 180/8.7; 305/4; 305/60
[58] Field of Search ................. 305/60, 46, 4; 180/8.1, 180/8.2, 8.6, 8.7, 7.1, 9.32, 10, 901, 164, 8.3, 8.5, 9.1

[56] References Cited

U.S. PATENT DOCUMENTS

| | | | |
|---|---|---|---|
| 3,170,532 | 2/1965 | Boppart | 180/164 |
| 4,664,212 | 5/1987 | Nagatsuka et al. | 180/901 |
| 4,699,252 | 10/1987 | Sing | 180/164 |
| 4,828,059 | 5/1989 | Naito et al. | 180/901 |
| 4,934,475 | 6/1990 | Urakami | 180/164 |

FOREIGN PATENT DOCUMENTS

| | | | |
|---|---|---|---|
| 0000581 | 1/1991 | Japan | 180/164 |
| 4-154494 | 5/1992 | Japan | 180/164 |

*Primary Examiner*—Mitchell J. Hill
*Assistant Examiner*—Anne Marie Boehler
*Attorney, Agent, or Firm*—Kanesaka & Takeuchi

[57] ABSTRACT

A robot traveling on wall face is capable of advancing or retreating on the wall face in a stable manner with a quick change-over of its traveling direction with the help of a plurality of movable adsorption discs designed for a close contact with the wall face, and a pair of fixed adsorption rods, while commencing to be moved by drive motors. The adsorption force by these movable adsorption discs is constantly so large that no worry of dropping the robot from the wall surface is needed. The frictional resistance of each frictional surface promotes contact between the robot and the wall face. Thereby, the robot works on the wall in a safe manner, instead of human workers.

4 Claims, 13 Drawing Sheets

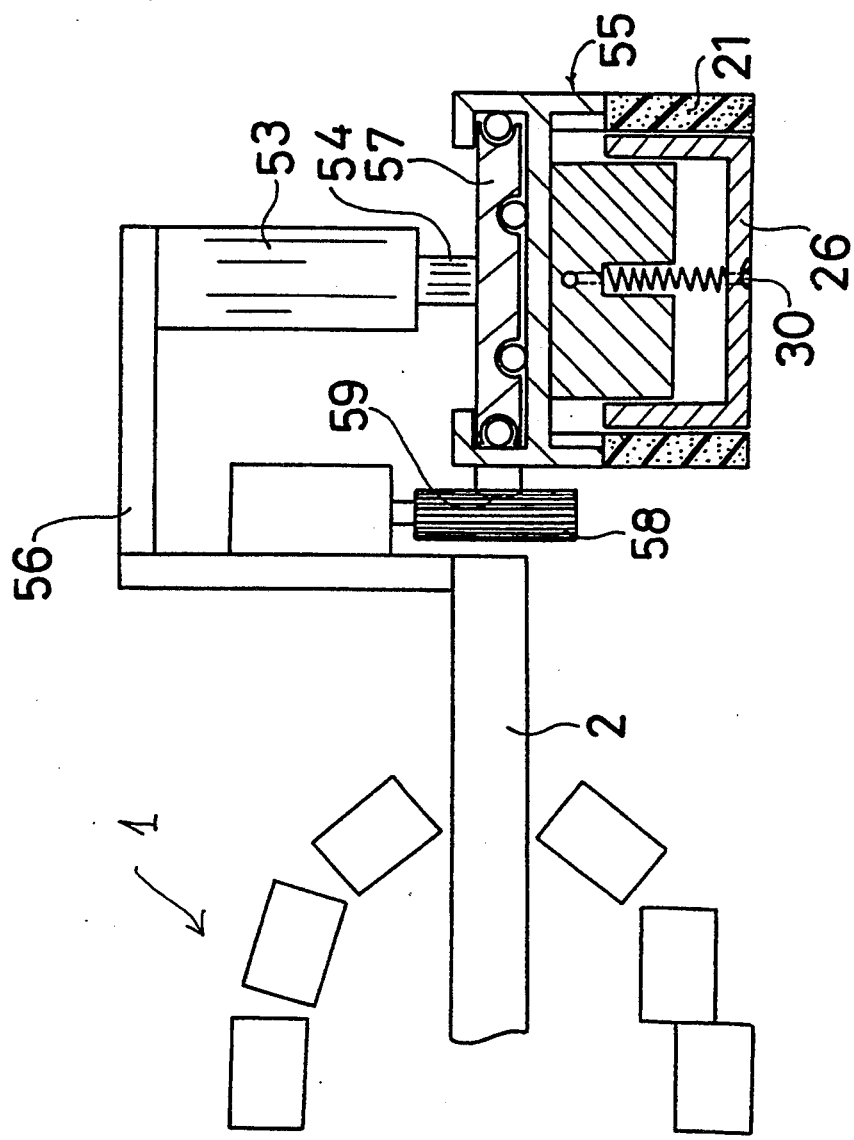

ROBOT TRAVELING ON WALL FACE

TECHNICAL FIELD

This invention relates to a robot traveling on a wall or along a ceiling surface of the construction such as building, bridge and the like.

BACKGROUND ART

As known well, the robot traveling on the wall has been widely utilized for performing works, such as cleaning, inspection and coating of the wall of the construction including building, bridge and tunnel, whose completion has conventionally required even the experienced worker to face the danger. As this kind of robot traveling on the wall, for example, the robot is found in the disclosure by Japanese unexamined patent application No. SHO (64)-5798.

The afore-mentioned disclosure is concerned with the liquid jet shutoff unit mounted to the robot traveling on the wall. This used robot can be traveled on the wall by means of a pair of crawler type traveling vehicles having a plurality of adsorption discs formed on the crawler surface and the suction force generated from them is subject to negative pressure which takes place in the space formed among the adsorption discs and the wall under the principles of jetting the compressed air, supplied by way of piping from compressor, from ejector.

Japanese unexamined utility model registration application No. HEI (01)-128475 and Japanese unexamined utility model registration application No. HEI (04)-38386, for example, disclose the movable adsorption disc used for the robot traveling on the wall.

The former application is concerned with improvements in the adsorption disc of the crawler type robot capable of moving on the wall and is characterized by disposing inducing suction part in the adsorption disc, the inducing suction part aiming specifically at a promotion of efficiency at the suction process performed just before a touch of the adsorption disc to the wall surface.

The latter application discloses an object of providing another adsorption disc easy to absorb as well as attainable to adhere, such merits being fulfilled by constructing the adsorption disc proper out of the hard adsorption disc base made of the hard elastic material and the soft adsorption disc top end made of the soft elastic member.

But, a series of the afore-mentioned applications have debatable points respectively: Namely, the model disclosed by the afore-mentioned Japanese unexamined patent application No. SHO (64)-5798 permits a pair of crawler type traveling vehicles having a plurality of adsorption discs formed on the crawler surface to travel the robot, so in addition to necessity of two units of crawlers, the construction of locating no adsorption disc in a space between the two units of crawlers might reduce the adsorption surface, thereby making the adsorption force weaker.

Both of the movable adsorption discs mentioned in the afore-mentioned Japanese unexamined utility model registration application No. HEI (01)-128475 and Japanese unexamined utility model registration application No. HEI (04)-38386 are constructed to make the adsorption against the wall easy as well as to attain the adherence to the wall constantly, the relative working efficiency being enhanced in the way of these applications, but if these kinds of movable adsorption discs are used for the robot required for traveling on the wall, resulting debatable points lie in easiness of the adsorption disc to be glided on the wall due to wet surface of the wall or the dead weight and in difficulty of putting the same into practical use at the working site simply in spite of being easy to adsorb and/or attainable to adhere constantly.

DISCLOSURE OF THE INVENTION a. Means of solving the debatable points

First, a means comprises a pair of 1st drive wheel and 1st coupled follower wheel, opposite to each other with the predetermined distance left between them, each of which is disposed on one end side of a frame body, another pair of 2nd drive wheel and 2nd coupled follower wheel, also opposite to each other with the predetermined distance left between them as well as reversive in positions of locating them compared with positions where the 1st drive wheel and 1st coupled follower wheel respectively are located, each of which is disposed on the opposite end side of the frame body, one unit of rotatable belt which is wound around the afore-mentioned two pairs of drive wheels and coupled follower wheels, being located at any of the one end side of the frame body and another opposite end side thereof, to be rotated, a plurality of movable adsorption discs fixed onto the outer peripheral surface of the rotatable belt, a suction pipe connecting the movable adsorption discs and a vacuum equipment, and controllers, disposed in the middle section of piping for the suction pipe, which connect to the vacuum equipment at a touch of the movable adsorption disc to the wall surface or disconnect from the vacuum equipment at a separation of the movable adsorption disc from the wall surface. The first means causes the possibility of giving a constant tension to the rotatable belt, whose rotating motion is initiated preliminarily by being wound around two pairs of drive wheels and coupled follower wheels and whose position is led by the construction where two units drive wheels are not only located separately at the one end side of the frame body and another opposite end side thereof respectively but also reversive from each other in their positions along a diagonal of virtual quadrangle formed by two pairs of drive wheels and coupled follower wheels, to enable a distance between the rotatable belt and the wall surface to be constant, thereby optimizing the adhesion to the wall surface, no matter which the drive wheels are rotated in positive or negative direction and allows an optional extension of lateral width of the movable adsorption disc much more than the clearance distance between the drive wheels and the coupled follower wheels to be possible, because the present means employs the construction, different from that of the conventional crawler type having two units of left and right crawlers, where one unit of rotatable belt, wider, is provided and a plurality of movable adsorption discs are fixed onto the outer periphery of the rotatable belt, thereby enabling not only an enlargement of the adsorption area against the wall surface to be attained but also a resulting rise in adsorption force between the robot and the wall surface to expect a maximization of the actuating performance or ability of the robot.

The second means is characterized by equipping the movable adsorption disc with a flexible enclosure frame and an antislipping member, movable within the enclosure frame, which is provided to be urged toward the wall surface and by an arrangement in which the suction force generated by the vacuum equipment permits a frictional surface of the antislipping member along which the touch between the antislipping member and the wall surface takes place to be contracted together with the enclosure frame against the urging force in a direction opposite to the wall surface. According to this means, the construction of the movable adsorption disc including the flexible enclosure frame and the antislipping member, movable within the enclosure frame, which is provided to be urged toward the wall surface and the mechanism of contracting the frictional surface of the antislipping member, where the touch between the antislipping member and the wall surface takes place, together with the enclosure frame in a direction opposite to the wall surface against the urging force, when the suction force is generated by the vacuum equipment to cooperate to enable the adhesion pressure directed to the wall surface, generated by having contracted the enclosure frame, to make the inside of the enclosure frame approximately air-tight, resulting in a fulfillment of firm adsorption between the movable adsorption disc and the wall surface. At the same time, a large frictional force being produced by pressure from the close contact between the wall surface and the frictional surface of the antislipping member and the closed contact therebetween being initiated by a motion of the antislipping member against the urging force, may prevent the movable adsorption disc from slipping on the wall surface. Since the stronger the suction force becomes, the more not only the pressure of close contact around the enclosure frame but also the frictional force arising against the urging force involved in the antislipping member are reinforced together, the adsorption force can be increased as much as possible. On the other hand, when a separation of the movable adsorption disc from the wall surface is co-worked with a suspension of the suction from the vacuum equipment, the restoring force possessed by the enclosure frame is to return a shape of the enclosure frame to the original shape thereof, also the antislipping member being returned to the original state, while the urging force moving the member toward the wall surface within the enclosure frame.

The third means aims at an establishment of the posture where the frictional surface of the antislipping member becomes in parallel with the wall surface just prior to a contact of the member with the wall surface, this designed aim being brought into reality by causing the movable adsorption disc to be fixed movably to and fro to the rotatable belt. According to the third means, the parallelism between the wall surface and the frictional surface, triggered just before the afore-mentioned contact therebetween, facilitates easily the adsorption to the wall surface.

The final means comprises a rotatable arm which is supported onto the frame body such that the arm can freely change over its direction, two units of vertically movable cylinders provided on both the ends respectively of the rotatable arm, a pair of fixed adsorption rods each of which is fixed to either of the vertically movable cylinders, a suction pipe connecting the fixed adsorption rod and the vacuum equipment to each other, and a selector valve, disposed in the middle section of piping for the suction pipe, for connecting and disconnecting the vacuum equipment and the fixed adsorption rod to/from each other. Specifically, the final means is concerned with operable steps including a change-over of direction of traveling the robot, a selection of traveling the robot toward any desired destination along the wall and the like: When changing over a direction of traveling the robot, further to the first step of stretching the two units of vertically movable cylinders provided on both the ends respectively of the rotatable arm, mounted to the frame body, in order to apply a pair of fixed adsorption rods, also provided on both the ends respectively of the rotatable arm, to the wall surface, the step proceeds subsequently to a change-over of the selector valve so that the fixed adsorption rods and the wall surface may be connected by way of the vacuum equipment, comprising a vacuum pump and the like, and the suction pipe to each other and correspondingly to let the negative pressure take place from the fixed adsorption rods, resulting in an establishment of firm adsorption of the fixed adsorption rods onto the wall surface. Still further steps are directed to disconnection of the movable adsorption discs and the vacuum equipment from one another and an additional stretching of the vertically movable cylinders, thereby detaching the movable adsorption discs from the wall surface and, after that, the robot body is to be rotated in a desired traveling direction with respect to the rotatable arm. Next, operable steps required for traveling the robot toward the desired destination along the wall include operations first in order of applying the movable adsorption discs to the wall surface in association with a contraction of the vertically movable cylinders and letting the adsorption force take place with the help from connecting the vacuum equipment and the movable adsorption discs to one another for the adsorption of the movable adsorption discs onto the wall face and other operations partly of permitting the selector valve to disconnect the fixed adsorption rods and the vacuum equipment and subsequently of providing a still additional contraction of the vertically movable cylinder for a detachment of the fixed adsorption rods from the wall surface, the last simple process proceeding to rotate positively or negatively the rotatable belt, thereby directing the robot to any desired destination on the wall.

Other features and advantages will be apparent from the Specification and Claims and from the accompanying drawings which illustrate embodiments of the invention.

BRIEF DESCRIPTION OF THE DRAWING

FIG. 15 is a sectional diagram taken on the line D—D of FIG. 14.

BEST MODE FOR CARRYING OUT THE INVENTION

Figure 1:
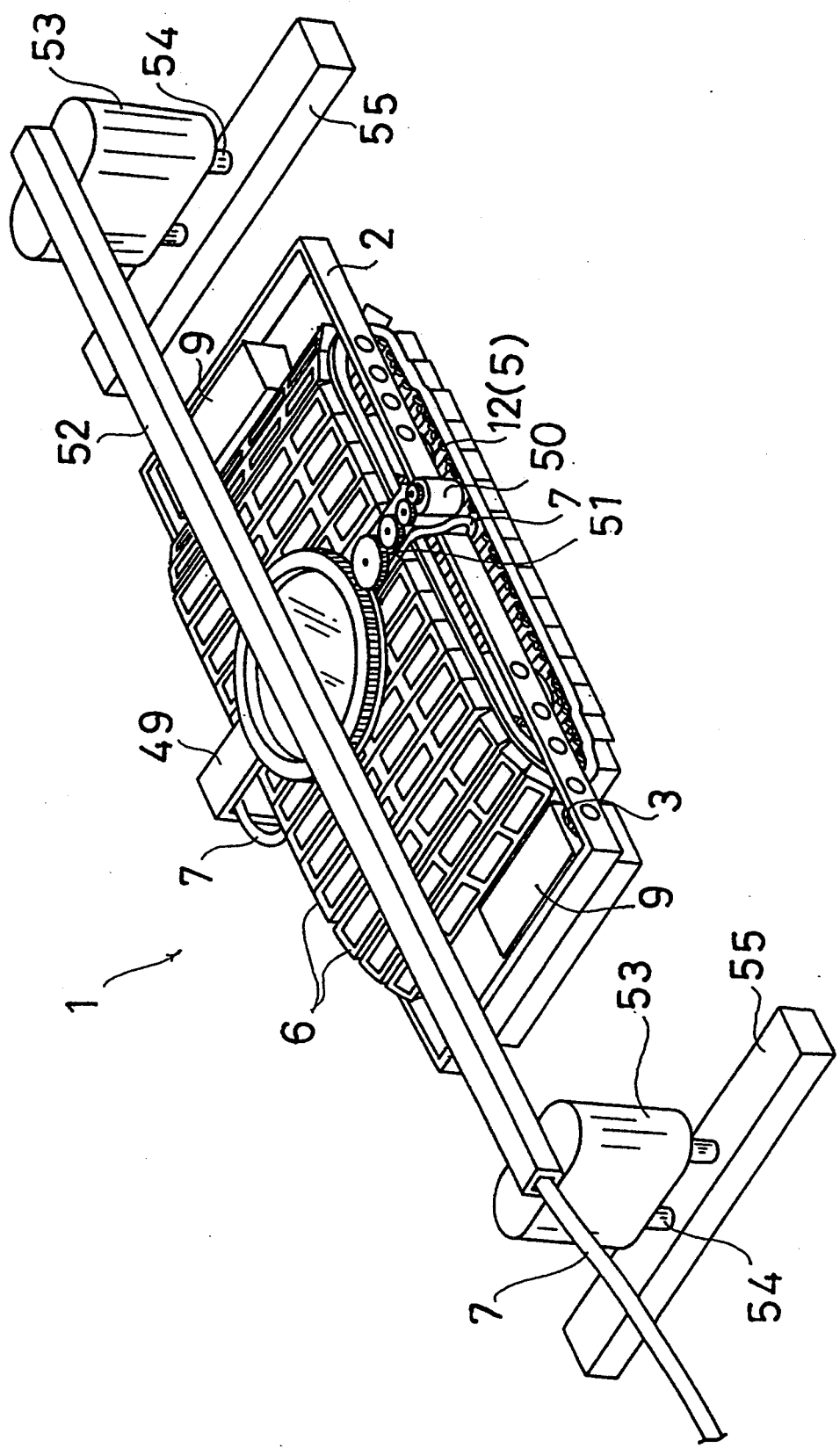
FIG. 1 is a perspective view of a robot traveling on wall surface of the present invention with movable adsorption discs used.
Figure 2:
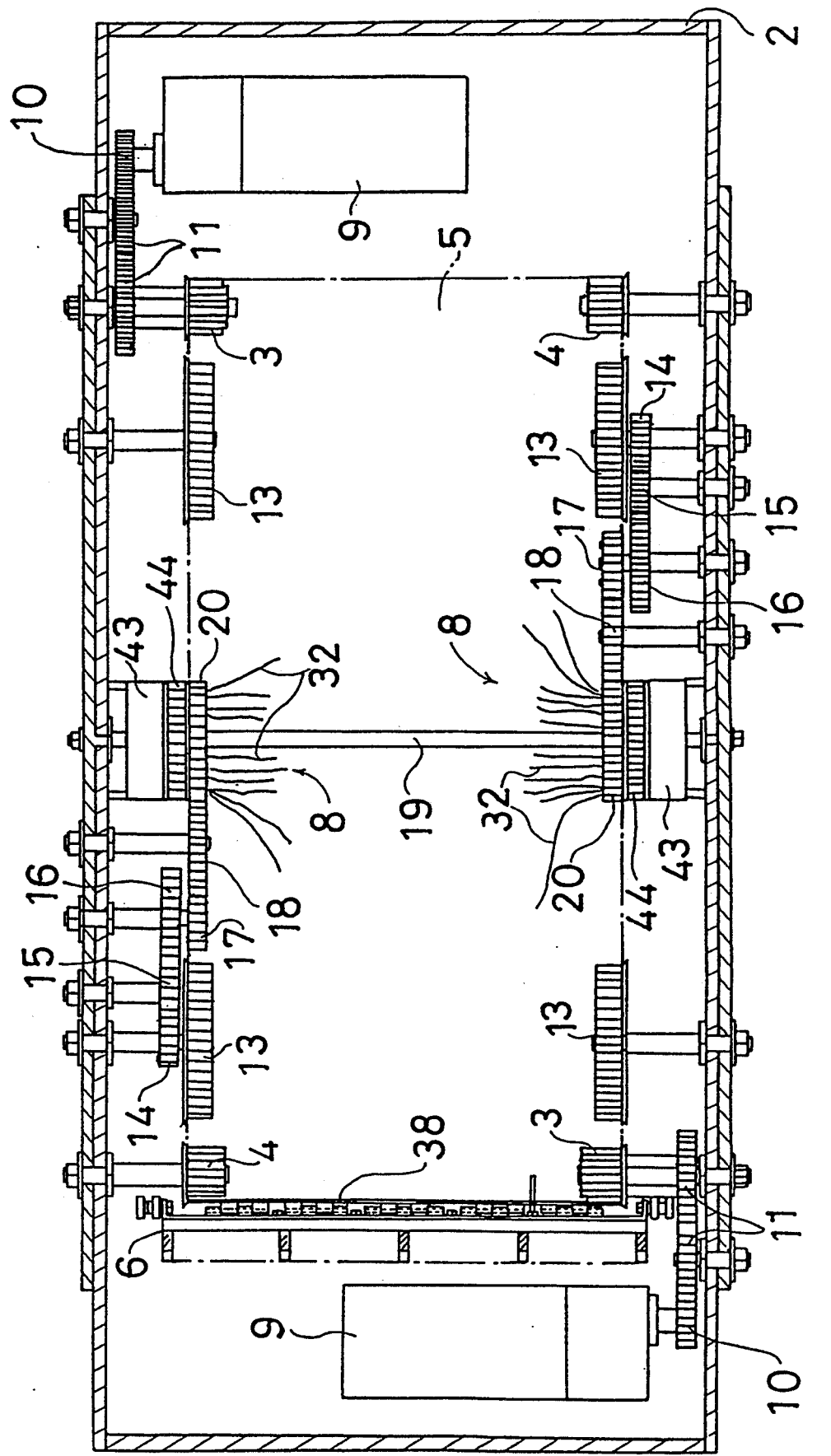
FIG. 2 is a plan diagram of a drive mechanism for the robot traveling on the wall surface for descriptive purpose only.
Figure 3:
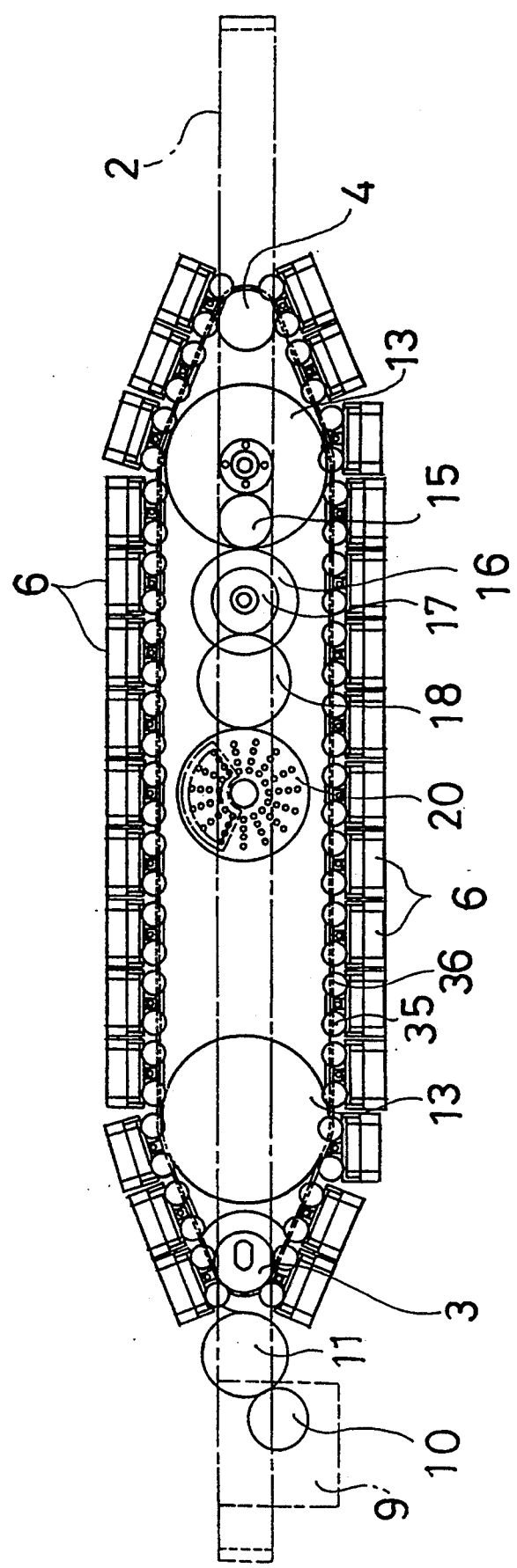
FIG. 3 is a side diagram of the drive mechanism for the robot traveling on the wall surface also for descriptive purpose only.
Figure 4:
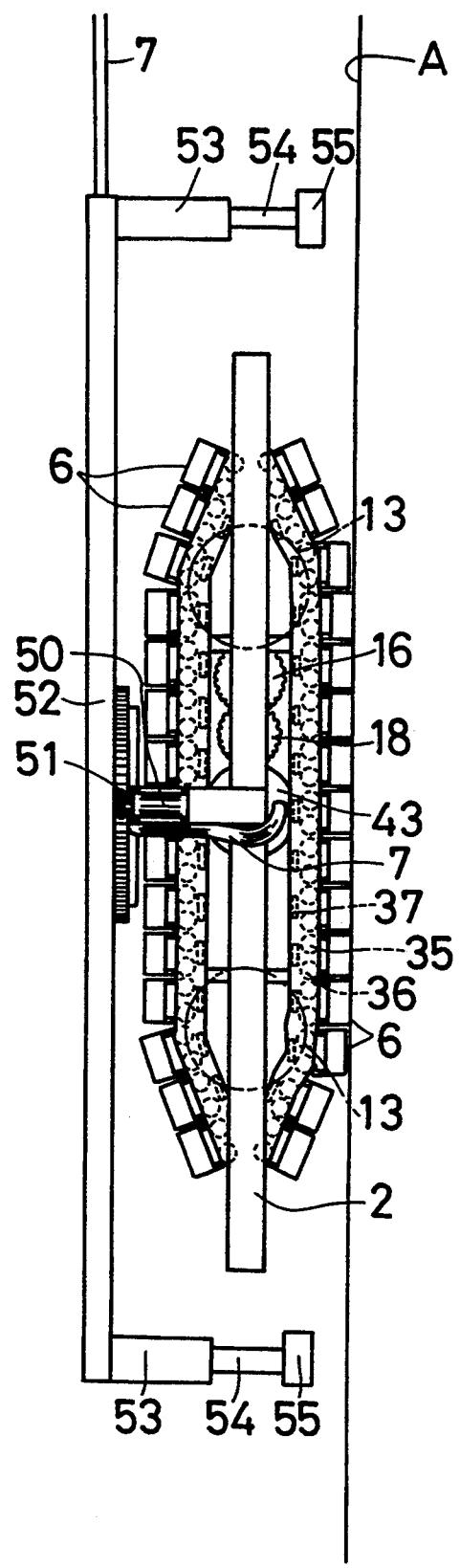
FIG. 4 is a view illustrating the robot in traveling on the wall of the construction.

A description of embodiments of the invention is made in conjunction with the accompanying drawings as follows: Referring first to FIGS. 1-3, basically, the robot traveling on the wall surface comprises a pair of 1st drive wheel 3 and 1st coupled follower wheel 4, opposite to each other, which are provided on one end side of the frame body 2 to be spaced with a distance equal to the lateral width of the frame body 2 left therebetween, another pair of 2nd drive wheel 3 and 2nd coupled follower wheel 4, also opposite to each other, which are provided on another opposite end side of the frame body 2 to make each position of 2nd drive wheel 3 or 2nd coupled follower wheel 4 reversive to that of 1st drive wheel 3 or 1st coupled follower wheel 4 respectively, one unit of rotatable belt 5 which is wound around the two afore-mentioned groups including a pair of 1st drive wheel 3 and 1st coupled follower wheel 4 and a pair of 2nd drive wheel 3 and 2nd coupled follower wheel 4 located at both the end sides respectively, opposite to each other, of the frame body 2, to be rotated, a plurality of movable adsorption discs 6 fixed on outer peripheral surface of the rotatable belt 5, suction pipes 7 connecting the movable adsorption discs 6 and the vacuum equipment (not shown) to one another, and controllers 8, provided in the middle section piping for the suction pipe 7, which are actuated to connect and disconnect to/from the vacuum equipment at a contact between the movable adsorption discs and the wall surface and a detachment of the movable adsorption discs from the wall surface respectively.

Figure 12:
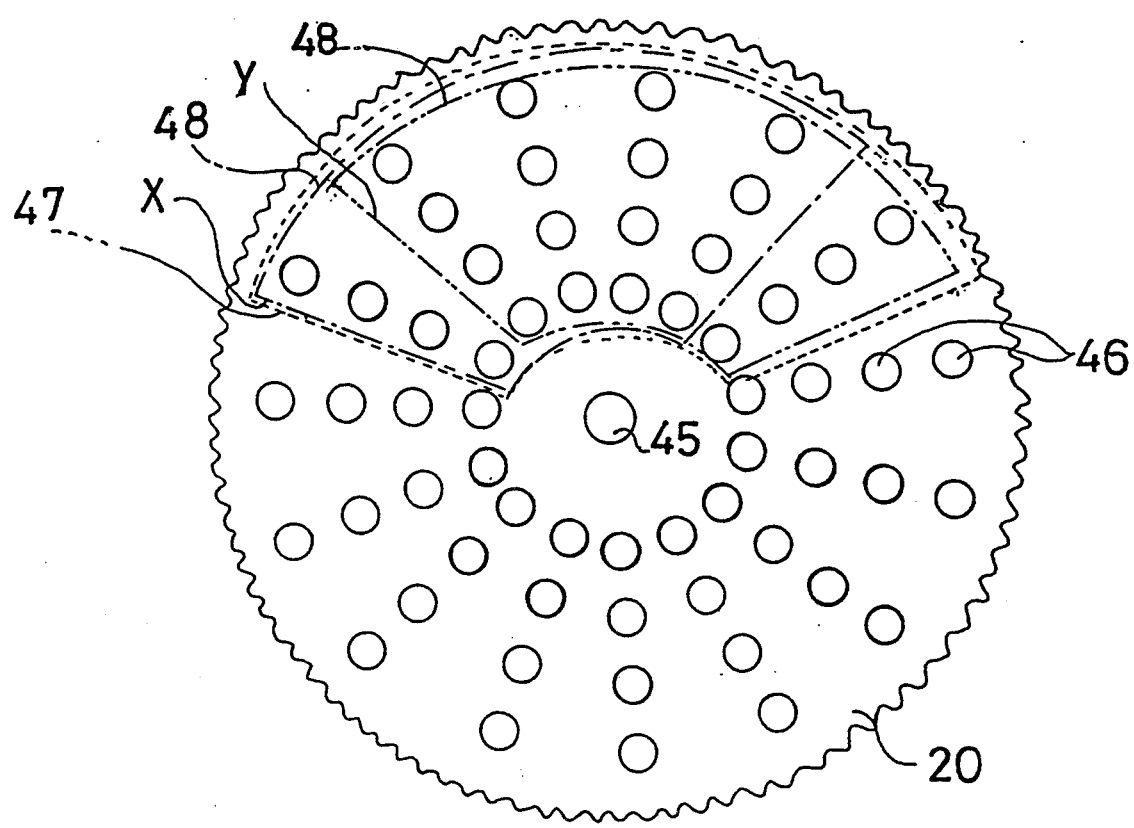
FIG. 12 is a diagram of controlling structure for descriptive purpose only.
Figure 13:
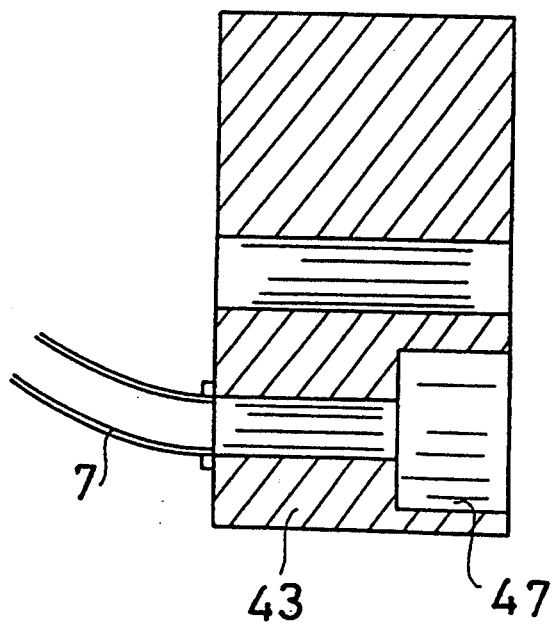
FIG. 13 is a sectional view taken on the line C—C of FIG. 11.

A motor 9 is provided on one end side of the frame body 2 of rectangular shape and a rotational motion is transmitted by way of a drive gear 10 and intermediate gears 11 and 11 all of which are provided on the frame body 2 from the motor 9 to the drive wheel 3. It will be apparent from FIG. 12 that the drive wheel 3 has teeth formed on its outer periphery, whereby the teeth become in mesh with tooth portions 12 formed on back face of the rotatable belt 5. On the other side, opposite to the afore-mentioned drive wheel 3, of the frame body 2 the coupled follower wheel 4 having the diameter equal to that of the drive wheel 3 is rotatably provided, also the outer periphery of the coupled follower wheel 4 being equipped with the teeth to become in mesh with the tooth portions 12 of the rotatable belt 5. Another motor 9 is provided on other opposite end side of the frame body 2 and, similarly to the afore-mentioned construction, on the other side corresponding to a position located at the opposite edge of a diagonal of the frame body 2 other drive gear 10, other intermediate gears 11 and 11 and other drive gear 3 are provided, the one side, opposite to the position of the last other drive gear 3, of the frame body 2 being equipped with other coupled follower wheel 4 such that the last other coupled follower wheel 4 may be rotatable.

A rotational drive is given from different sides one of which, located at the frame body 2, is equipped with a pair of drive wheel 3 and coupled follower wheel 4, opposite to each other, having teeth together for windable engagement with tooth portions 12 formed on the inner peripheral surface of the rotatable belt 5 and another of which, also located at the frame body 2, is equipped with another pair of drive wheel 3 and coupled follower wheel 4, opposite to each other, having teeth together for windable engagement with tooth portion 12 thereon to the rotatable belt 5. For this reason, irrespective of positive or negative rotation as well as even when a rotational change-over is required, the rotatable belt 5 can maintain tension so sufficiently that no slack of the belt 5 takes place, whereby the robot 1 can always hold its close contact with the wall surface and allows the resulting rise in adsorption force to travel the robot 1 as stably as possible, whenever travelling on the wall is required.

Furthermore, the rotatable belt 5 is in mesh with four idler wheels 13, rotatable, first two of which are located between a pair of drive wheel 3 and coupled follower wheel 4 on one end side of the frame body 2 and remaining two of which are located between another pair of drive wheel 3 and coupled follower wheel 4 on another opposite end side of the frame body 2. Each diameter of these idler wheels 13 is larger than that of the drive wheel 3. Two control wheels 20, located at the center of the frame body 2, holding a shaft 19 in common are driven by gears 14 fixed to axes of two of these four idler wheels 13 both Of which, being separately located on one side or other opposite side of the frame body, are closer to the coupled follower wheels 4 respectively, two units of 1st intermediate gears 15 and two units of 2nd intermediate gears 16 which are rotatably supported onto axes respectively fixed to the frame body 2, and two units of 3rd intermediate gears 17 and two units of 4th intermediate gears 18 co-axial together with the afore-mentioned two units of 2nd intermediate gear 16. The engagement caused by these gear mechanisms can regulate a synchronization between one rotation of the control wheels 20 which may be transmitted from the idler wheels 13 thereto and one rotation of the rotatable belt 5 to be attained under an arrangement of bringing the number of teeth of each control wheel 20 and number of tooth portions 12 of the rotatable belt 5 into a coincidence.

Figure 5:
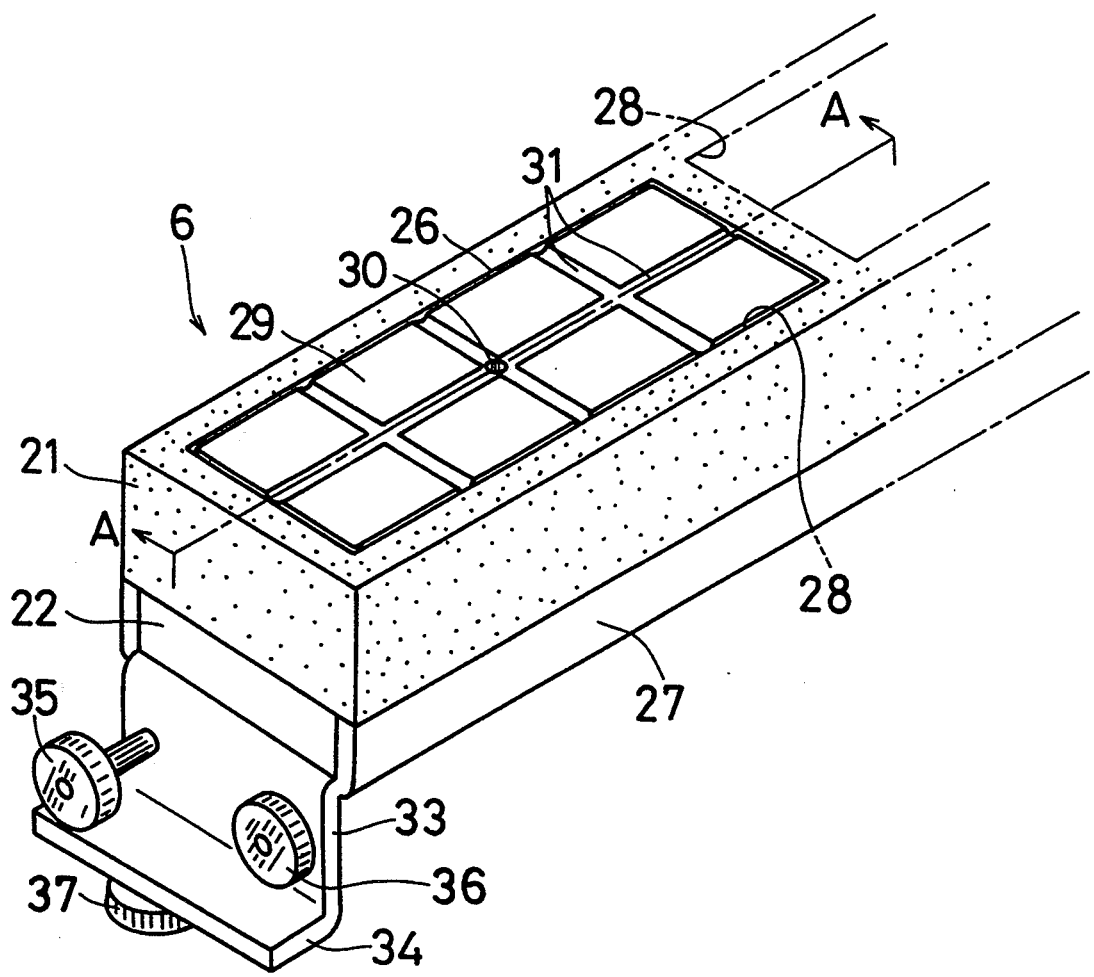
FIG. 5 is a perspective view illustrating partially the movable adsorption disc.
Figure 6:
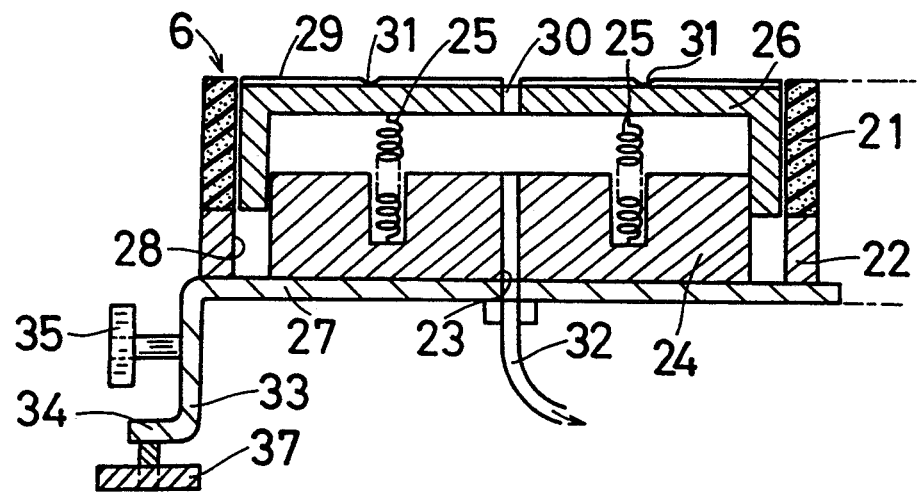
FIG. 6 is a sectional diagram taken on the line A—A of FIG. 5 for descriptive purpose only.

As shown in FIGS. 5 and 6, a construction of the movable adsorption disc 6 comprises a base plate 22 provided at lower part of a enclosure frame 21 of rectangular shape being horizontally longer as well as formed of elastic synthetic rubber, a pedestal 24 with an air hole 23 provided in the enclosure frame 21, the anti-slipping member 26 of box type, interposed between and surrounding of the pedestal 24, the enclosure frame 21, and the base plate 22 and located over the pedestal 24, which is urged to move in a direction opposite to a position of the pedestal 24 by elastic bodies 25, and a mounting frame 27 to which both of the pedestal 24 and the base plate 22 are fixed.

Figure 7:
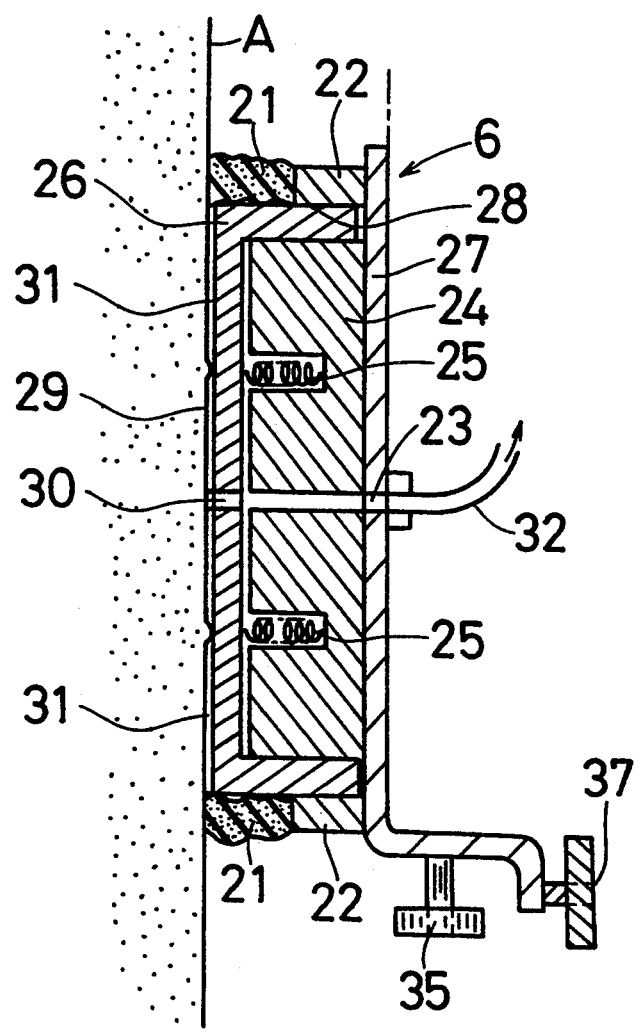
FIG. 7 is a sectional diagram of the movable adsorption disc being adsorbed on the wall surface for descriptive purpose only.

Each antislipping member 26 of box type, being provided in one of suction chambers 28 formed in inside of the enclosure frame 21, has its center equipped with a through hole 30 communicating with the frictional surface 29, a plurality of suction grooves 31 being formed to be intersected one another on the frictional surface 29 with the through hole 30 crossed by them. Consequently, for example, an illustration of FIG. 7 might help to clarify a mechanical arrangement, becoming required for a touch of the robot with the perpendicular wall surface A, in which upon commencement of suction from the air hole 23 by way of a movable suction pipe 32, the air is being sucked in through a passage 15 including the suction groove 31, the through hole 30 and the air hole 23 and the antislipping member 26 is caused to move toward the pedestal 24 located oppositely to the wall surface A against by the urging force of the elastic body 25, such a movement of the antislipping member 26 being correspondingly accompanied with a sealing between the wall surface A and the enclosure frame 21 to be concurrently contracted. That acts as a trigger for the adsorption between the frictional surface 29 of the antislipping member 26 and the wall surface A to complete an adherence to the wall surface A. For quality of the antislipping member 26, the optimum material is wood, but such a limit may not be always absolute.

FIGS. 5 and 6 illustrate details of the mounting frame 27. Each of ends located in a relatively longer direction of the mounting frame 27 is equipped with a perpendicular piece 33 bent down in a direction opposite to the position of the enclosure frame 21 and a horizontal piece 34 further bent outward from the end of the perpendicular piece 33, the perpendicular piece 33 being furnished with a 1st guide wheel 35 and a 2nd guide wheel 36 having shafts respectively, different in length from each other, with positions of these guide wheels 35 and 36 being together in parallel with the horizontal piece 34. In addition a 3rd guide wheel 37, rotated at a position of having its rotating direction formed in a right angle with each of rotation directions of the 1st and 2nd guide wheels 35 and 36, is provided under the horizontal piece 34. A reference to FIG. 10 might make it clear that a back face of each mounting frame 27 is rotatably fixed through a hinge 38 to the outer peripheral surface of the rotatable belt 5 by means of screws and the like and a slight gap between adjacent mounting frames 27 causes an angle of rotating them in a free manner to be smaller.

Figure 8:
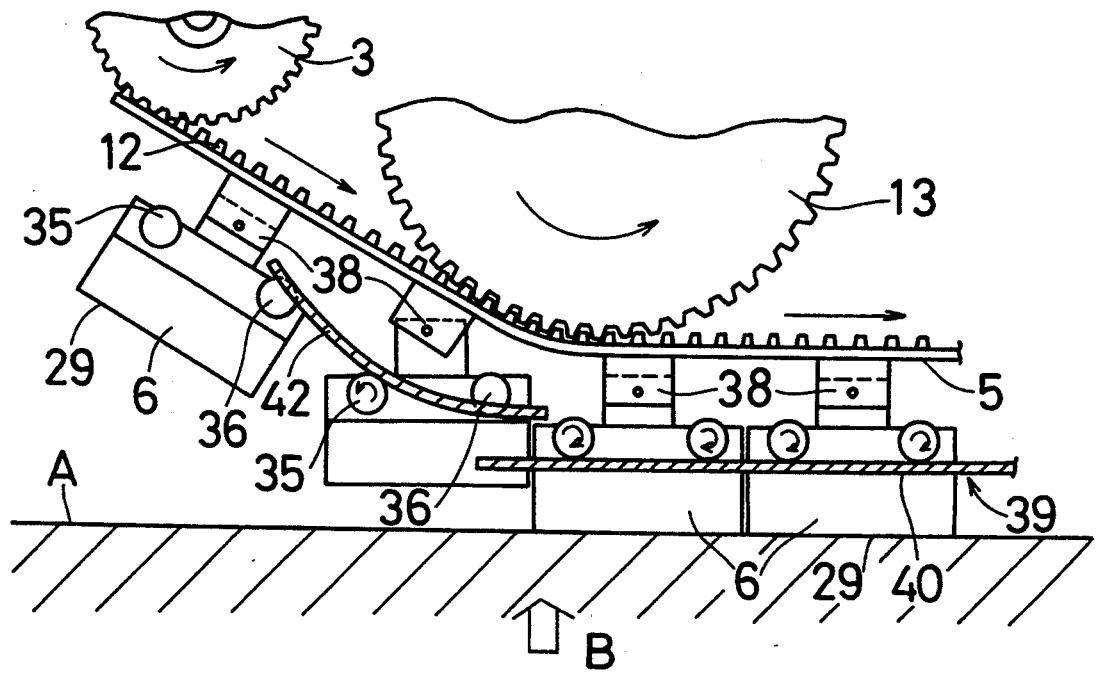
FIG. 8 is a partially omitted diagram of a guide portion and an auxiliary guide portion for descriptive purpose only.
Figure 9:
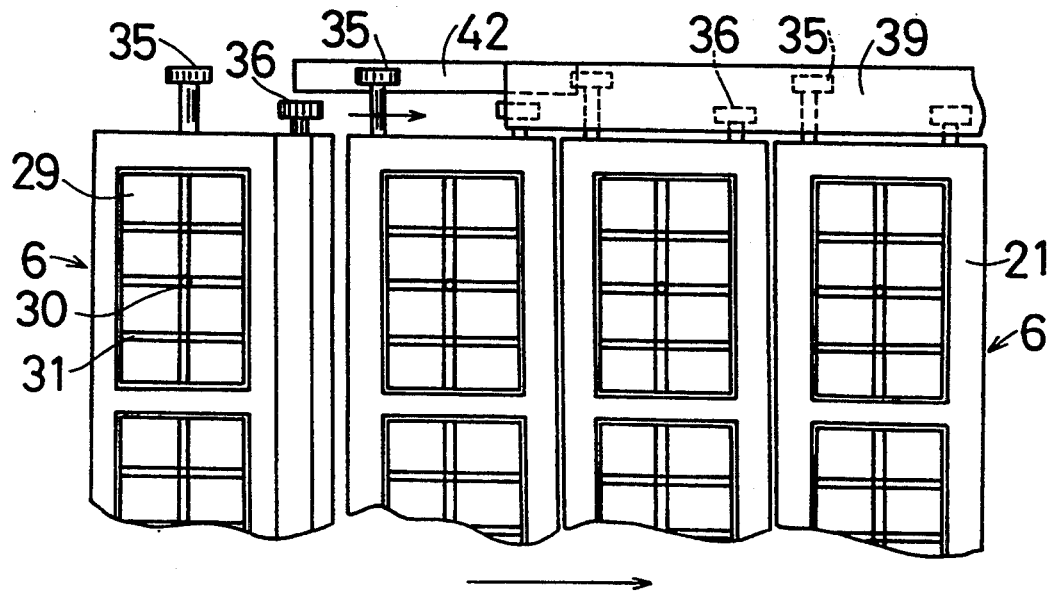
FIG. 9 is a back view taken from a direction of arrow B of FIG. 8.
Figure 10:
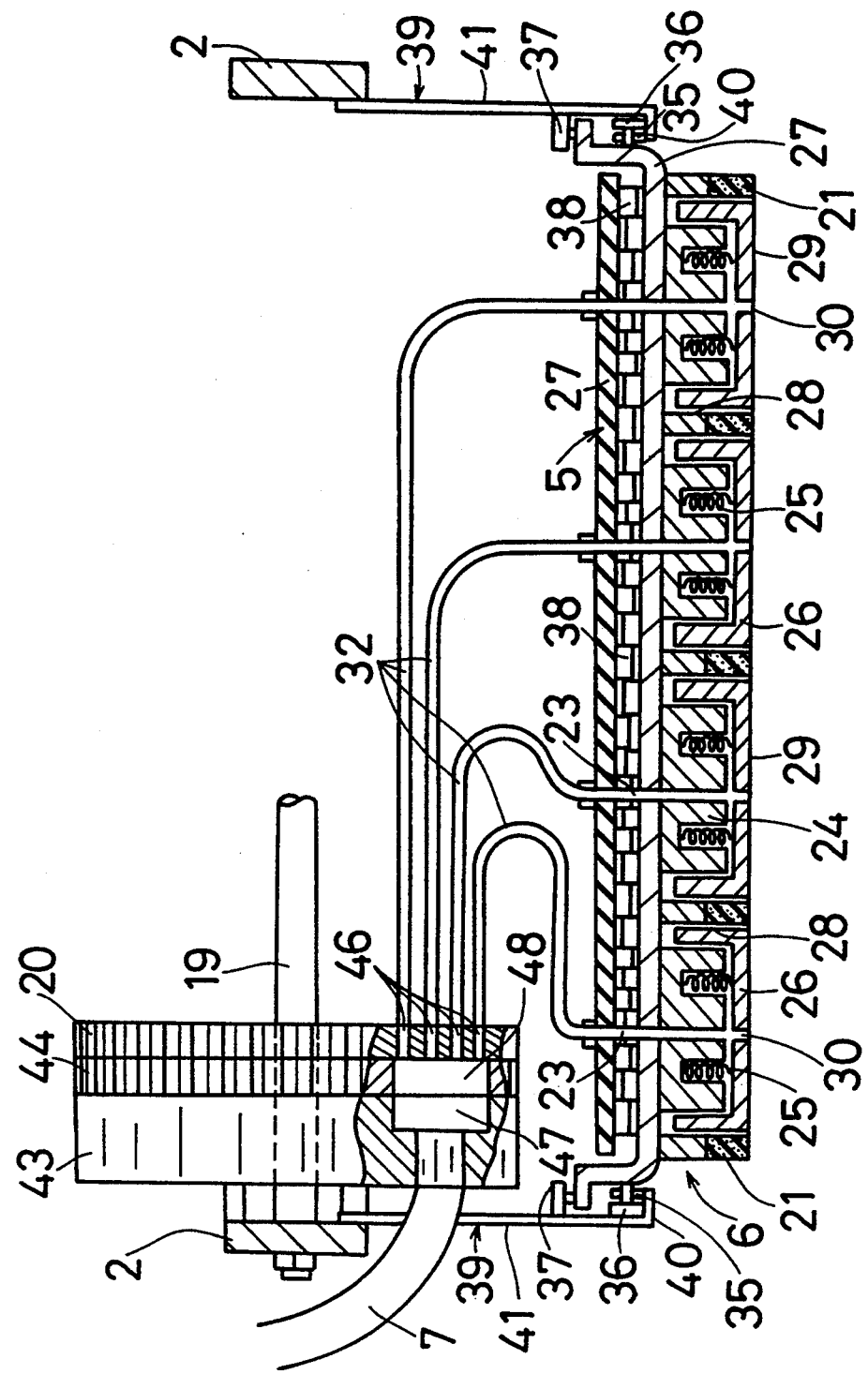
FIG. 10 is a sectional view of a state of mounting a controller and the movable adsorption discs to one another for descriptive purpose only.
Figure 11:
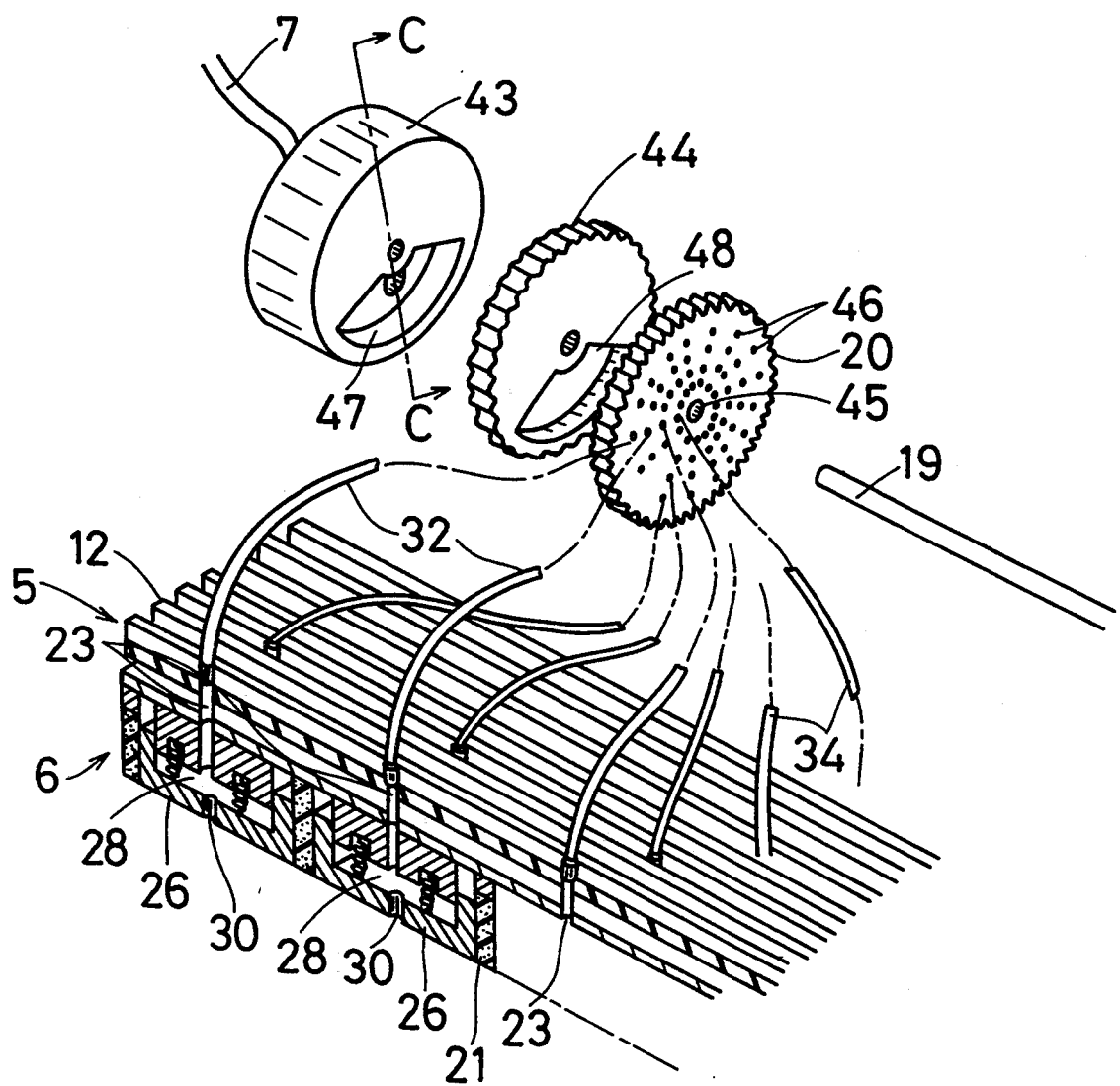
FIG. 11 is a perspective exploded diagram of a state of mounting the controller and the movable adsorption discs to one another for descriptive purpose only.

Referring then to FIGS. 8, 9, and 10, in a side where the frame body 2 faces the wall surface A a linear guide rail 39 for guiding the three guide wheels 35, 36, and 37 on the mounting frame 27 is disposed. The linear guide rail 39 aims not only at a equal distribution of force acting upon an occurrence of detachment of the frame body 2 from the wall surface A because of unbalanced load applied against the robot traveling on the wall surface at a constant parallel state between the movable adsorption discs 6 fixed on the outer peripheral surface of the rotatable belt 5 and the wall surface A to all the movable adsorption discs 6 but also at a prevention of the robot from oscillating to right or left from its planned traveling direction, when the rotatable belt 5 is being in mesh with two pairs of drive wheels 3 and coupled follower wheels 4 and two pairs of idler wheels 13 for being rotated. For this reason the guide rail 39 has a 1st guide 40 for guiding the 1st and 2nd guide wheels 35 and 36 in a direction parallel with the wall surface A and a 2nd guide 41 for guiding the 3rd guide wheel 37 in a direction perpendicular to the wall surface A.

It will be apparent from FIGS. 8 and 9 that an auxiliary guide rail 42 of circular shape is provided to run from the lower part of each of the idler wheels 13 located at both the ends of the afore-mentioned linear guide rail 39 to the lower part of the drive wheel 3 or the coupled follower wheel 4. Also apparently, the auxiliary guide rail 42 is used for correcting a posture of the frictional surface 29 of the antislipping member 26 of the movable adsorption disc 6 which is going to be just prior to its touch with the wall surface so that the frictional surface 29 thereof may become in parallelism with the wall surface A. The 1st guide wheel 35 having a relatively longer shaft, provided on the perpendicular piece 33 of the mounting frame 27, is guided by a convex face of circular shape of the auxiliary guide rail 42, whereby the movable adsorption disc 6 is rotated with the hinge 38 as center to establish the parallel state concerned. On the other hand, to prepare for the reversive rotation in advance, the same kind of auxiliary guide rail 42 is provided in the opposite end side and, in such a case of the reversive rotation, the 2nd guide wheel 36 having a relatively shorter shaft is guided by the convex face of circular shape of the latter auxiliary guide rail 42. For this reason, the latter auxiliary guide rail 42 results in being provided closer to the mounting frame 27 to the extent equal to a distance produced by the shorter shaft of the 2nd guide wheel 36.

Each controller 8 comprises basically a controlling wheel 20, a controlling plate 43 fixed to the frame body 2, and a selector plate 44, movable to and fro, which is interposed between the controlling wheel 20 and the controlling plate 43. 15 lines of groups each of which includes 4 units of round holes 46 are spaced with the angular intervals left equally between them, and extend in a radial direction from a center hole 45 penetrated by a shaft 19 to the outer periphery of the controlling wheel 20. A line of 4 round holes 46 has them associated correspondingly with 4 units of air holes 23 respectively on one of the movable adsorption discs 6, the flexible movable suction pipes 32 connecting individually these round holes 46 and air holes 23 on the movable adsorption disc 6 to one another. Generally, at least 30 units of movable adsorption discs 6 are fixed on the outer peripheral face of the rotatable belt 5 so that a corresponding relation between 15 lines of round holes 46 on one controlling wheel 20 and a half the number of, i.e. 15 units of, the movable adsorption discs 6 is established, further resulting in managing two units of controlling wheels 20 to correspond to the overall movable adsorption discs 6. For promotion of the safe actuation, after all, the adjacent movable adsorption discs 6 become in a corresponding relation with one line of round holes 46 respectively located on each of the two different controlling discs 6, whereby in the case of any accident damaging either of the controllers 8 a state of adsorbing half the number of movable adsorption discs 6 to the wall face A is maintained.

The afore-mentioned gear mechanism allows two units of controlling wheels 20, opposite to each other, to be rotated together in the same direction at the same speed and also their rotation being forced to arise in the same direction at the same speed under an arrangement of fixing each of them to the shaft 19 which has, as mentioned above, its both ends supported rotatably onto the frame body 2. Furthermore, these two controlling wheels 20 and the rotatable belt 5 are arranged to be rotated in the same direction as well as to have mutually the same number of teeth, whereby, in addition to a resulting synchronization of rotating the rotatable belt 5 by one turn every one turn of rotating the controlling wheel 20, no existence of any shaft corresponding to the shaft 19 between the drive wheel 3 and the coupled follower wheel 4 makes it possible to move rotatably 120 units of movable suction pipes 32 connecting the round holes 46 on the controlling wheels 20 and air holes 23 respectively of the movable adsorption disc 6 without a mutual entanglement of the movable suction pipes 32.

The controlling plate 43 is fixed by way of the selector plate 44 to the frame body 2 such that the controlling plate 43 becomes concentric to each controlling wheel 20. Packings are put into sections respectively among the controlling plate 43, the selector plate 44, and the controlling wheel 20 to make these sections air-tight. The suction pipe 7 to which a suction through hole 47 of circular shape, formed on the controlling plate 43, is connected causes the air to be sucked by way of the selector plate 44 from all the round holes 46 on the controlling wheel 20 upon locating of the round holes 46 at the suction through hole 47. In general, 11 units of movable adsorption discs 6 are adapted to be adsorbed toward the wall surface A at constant under an arrangement of 11 lines of round holes 46 in total, located on the suction through holes 47 respectively of the two units of controlling plates 20, specifically while the round holes 46 on one side run in 6 lines, whereas the round holes 46 on another side run in 5 lines. Since the selector plate 44 is also equipped with a suction hole 48 of the same shape as that of the suction through hole 47, the suction force from the suction pipe 7 is conveyed toward each movable adsorption disc 6, flowing through passage including the controlling plate 43, the selector plate 44, the controlling wheel 20 and the movable suction pipe 32. A The further construction is that a rotation of a control motor (not shown), fixed to the frame body 2, whose gears are in mesh with the gears formed on the outer periphery of the selector plate 44, causes the controlling wheel 20 to be rotated only by an angle made by 2 lines of round holes 46 with each other with the shaft as a center, i.e. the controlling wheel 20 is triggered to be rotated by a distance ranging from a position illustrated by dashed line X in FIG. 12 to a position illustrated by two-dot chain line Y, thereby changing over the adsorption position of each movable adsorption disc 6. As a result, among 11 units of movable adsorption discs 6 in suction process a primary movable adsorption disc 6 being going to perform the suction process changes over its position and the movable adsorption disc 6 at a front row in the direction of advancing the robot traveling on the wall surface 1 becomes constantly sucked in.

Either a vacuum pump, or a device supplying the compressed air and sucking in the same under the principles of an ejector may be workable as the vacuum equipment. For installation place of the vacuum equipment, any option including such a higher place as rooftop of the construction being partially constituted by the wall surface A, a ground, or a loading the robot 1 with the equipment may be acceptable. If the afore-mentioned higher place is used, a connection between the vacuum equipment and the robot 1, realized by the suction pipe 7, may give rise to an advantageousness of preventing the robot 1 from dropping by means of utilizing the suction pipe 7 instead of a lifeline, even if a marked lowering of suction force by the movable adsorption discs 6 should arise to make it impossible to adsorb the robot 1 against the wall surface A.

Thus, when advancing the robot traveling on the wall surface 1 of the afore-mentioned basic constructions along the wall surface A of such a construction as building, first of all, the initially required steps are only to let the frictional surfaces 29 of 11 units of movable adsorption discs 6, located at the lower part of the robot traveling on the wall surface 1, to be in contact with the wall surface A and to connect these movable adsorption discs 6 with the vacuum equipment (not shown). Then, 11 units of movable adsorption discs 6 which are connected through the suction through holes 47 of circular shape on the two controlling plates 43, the suction holes 48 on the seletor plates 44, 11 lines of round holes 46 in total, located correspondingly at these two suction holes 48 respectively, and 44 units of round holes 46 in total, running similarly in 11 lines, all of which are made on the two controlling wheels 20, and the movable suction pipes 32 from the suction pipe 7, facing the wall surface A, will be sucked in to reduce pressure in 44 units of suction chambers 28 in total on the movable adsorption discs 6 and to maintain the close contact between the movable adsorption discs 6 and to maintain the close contact between the frictional surfaces 29 of the antislipping members 26 and the wall surface A, thereby avoiding a drop of the robot traveling on the wall 1 from the wall surface A. Furthermore, when the antislipping member 26 in each suction chamber 21 causes the enclosure frame 21 of the movable adsorption disc 6 to be contracted upon the suction process, the frictional surface 29 of each antislipping member 26 becomes in close contact with the wall surface A to reinforce the frictional force against the wall surface A, thereby giving rise to a merit of maximizing a difficulty in dropping slipperily the robot 1 from the wall surface A. With a plurality of suction chambers 28 provided in the movable adsorption disc 6 as mentioned in the present embodiment, the suction process is performed independently from each suction chamber 28, so even when any accident of giving damages to each suction chamber 28 and/or each movable suction pipe 32 takes place to suck in the atmospheric air, no therefor a required for the safety where no drop of the robot traveling on the wall surface 1 from the wall surface A is managed to be avoided.

In order to commence to travel the robot 1 along the wall surface A, an initial step of supply current into electric wire connected to the power supply in a manner of being bundled together with the suction pipe 7 which is connected to the vacuum equipment (not shown) causes two units of motors 9 to be driven in a positive or negative direction. The two units of drive wheels 3 each of which is located at either of both the diagonals are in turn rotated at the same time to rotate the rotatable belt 5. At that time the controlling wheels 20 in mesh under the afore-mentioned gear mechanism with two of the four units of idler wheels 13 which are engaged with the rotatable belt 5 commence also to be rotated. As mentioned above, the controlling wheels 20 are adapted to be sucked in only from 11 units of movable adsorption discs 6 located on the wall surface A, so no sucking-in from the movable adsorption discs 6 located at the front and rear cads or at the position opposite to the wall surface A is generated, resulting in an effective utilization of the suction force from the vacuum equipment. One of 11 units of movable adsorption discs 6 to perform the sucking-in process during traveling the robot 1 not only brings the sucking-in process into commencement slightly prior to its touch with the wall surface but also is moved to and fro with the hinge 38 as a center just before its touch therewith by means of the auxiliary guide rail 42, the 1st guide wheel 35 or the 2nd guide wheel 36 so that each frictional surface 29 becomes in parallel with the wall surface A, thereby making the adsorption against the wall surface A relatively easier.

When changing over the traveling direction of the robot 1 into a reversive direction, the first step is to drive a control motor (not shown) to rotate the selector plates 44 only by a distance equal to angle made with the two adjacent lines of round holes 46, whereby, among 11 units of movable adsorption discs 6 for sucking-in, the afore-mentioned reasons cause still the movable adsorption disc 6 just before its touch with the wall surface A to the sucking-in process to make the adsorption against the wall surface A easier. Additional steps of rotating the motors 9 in a reversive direction to drive the two units of drive wheels 3 similarly to the afore-mentioned arrangement and of causing the rotatable belt 5 to be rotated in a reversive direction allow the robot traveling on the wall surface 1 to advance toward a reversive direction. Thus, a series of the sucking-in processes, performed continuously by the movable adsorption discs facing the wall surface A and/or controls by the controllers 8 for stop of the sucking-in process of the movable adsorption discs 6 to be detached from the wall surface A will enable the robot 1 to travel back and forward.

Depending on application modes, the frame body 2 of the robot traveling on the wall surface 1 of the afore-mentioned constructions may be flexibly furnished with a applicator, a cleaner, a coating unit and the like for the wall surface A to execute multi-works. In those cases, if the robot traveling on the wall surface 1 can change-over its directional course other than its advance or retreat during the works, it improves the working efficiency to a remarkable extent, so it is preferable to equip the frame body 2 with a direction selector unit.

As shown in FIG. 1 the direction selector unit comprises a rotatable arm 52, being able to change its direction by means of a swiveling motor 50 and a gear train 51, which is supported by way of a fixed arm 49 onto the upper part of the frame body 2, a pair of vertically movable cylinders 53 provided on both the ends respectively of the rotatable arm 52, a pair of fixed adsorption rods 55 fixed to rods 54 respectively of the vertically movable cylinders 53, the suction pipe 7 connecting these fixed adsorption rods 55 and the vacuum equipment (not shown) and a selector valve (not shown), provided in the middle course of pipings for the suction pipe 7, for connecting and disconnecting the vacuum equipment and the fixed adsorption rods 55 to/from one another. The vertically movable cylinders 53 are connected to the suction pipe 7 such that the sucking-in generated in the inside of them enables the rods 54 to be vertically controlled. The construction of the fixed adsorption rods 55 is the same as that of the movable adsorption discs 6.

In order to actuate the afore-mentioned direction selector unit for a change-over of advancing direction of the robot 1, and to extend the rods 54 of a pair of vertically movable cylinders 53 provided on both the ends respectively of the rotatable arm 52 to trigger the fixed adsorption rods 55 to be in contact with the wall surface A, negative pressure is required to be generated in the fixed adsorption rods 55, connected by way of the suction pipe 7 to the vacuum equipment with a selector valve (not shown) being switched so that a firm adsorption of the fixed adsorption rods 55 against the wall surface A may be established and, after that, upon disconnection of the movable adsorption discs 6 and the vacuum equipment from one another, the rods 54 of the vertically movable cylinders 53 are adapted to be additionally extended to detach 11 units of movable adsorption discs 6 from the wall surface A, then rotating the robot 1 in a new desired advancing direction relatively to the rotatable arm 52. At that time, the swiveling motor 50 is driven to rotate the gear train 51. Subsequently, a contraction of the rods 54 of the vertically movable cylinders 53 will cause 11 units of movable adsorption discs 11 to become in contact with wall surface A and a commencement of such a contact therebetween in turn proceeds to the following step of generating adsorption force by means of a connection between the vacuum equipment and the movable adsorption discs 6 for an initiation of firm adsorption of them against the wall surface A and, reversively, a disconnection of the vacuum equipment and the fixed adsorption rods 55 from one another by means of actuating the selector or valve is to be followed by the final step of contracting still additionally the rods 54 of the vertically movable cylinders 53 for a detachment of the fixed adsorption rods 55 from the wall surface A, simply driving of the two units of motors 9 being required to rotate the rotatable belt 5 in a positive or negative direction, thereby completing steps capable of leading the robot 1 to be advanced toward the desired directional destination.

Figure 14:
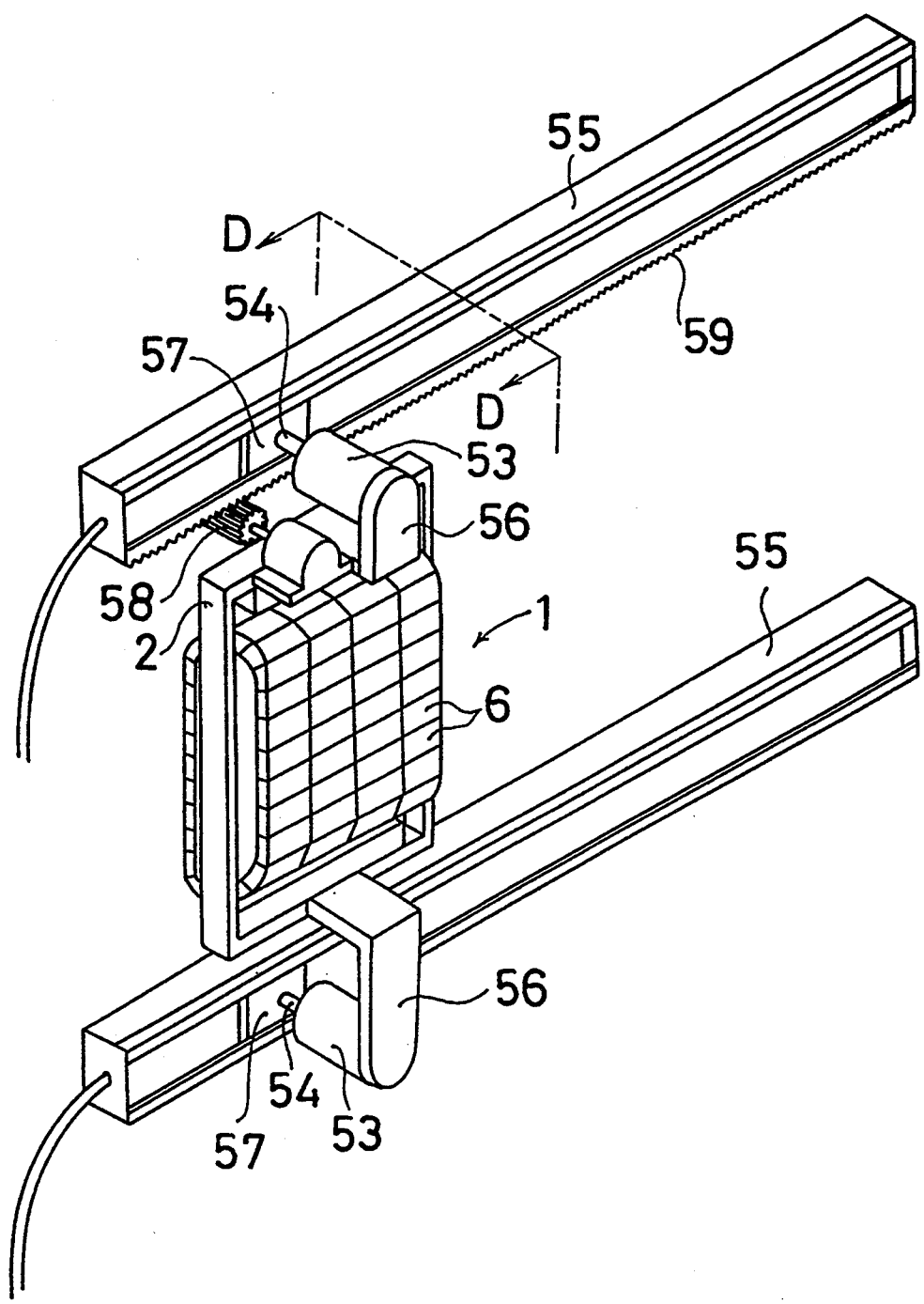
FIG. 14 is a perspective diagram of the robot traveling on the wall according to another embodiment of the invention.

FIGS. 14 and 15 illustrate another embodiment, wherein a moving unit becoming effective in the case of requiring the robot traveling on the wall surface 1 to be moved only in a lateral direction due to a necessity for fulfillment of objective of any work by the robot 1 is illustrated to be available for use. According to the embodiment, a construction includes vertically movable cylinders 53 provided on both the ends respectively of the frame body 2 of the robot traveling on the wall surface 1 by means of mounting arms 56, the fixed adsorption rods 55 of longer length mounted to the top ends of rods 54 of the afore-mentioned vertically movable cylinders 53, each of upper surfaces of the fixed adsorption rods 55 and each of the top ends of the rods 54 being constructed to be slidable to each other in association with sliding plates 57, and, additionally, an engagement between drive gears 58 provided on both the ends of the frame body 2 and teeth 59 formed along the inner sides of the two units of fixed adsorption rods 55.

Thus, the construction of the embodiment will enable the robot traveling on the wall surface 1 to be moved in a lateral direction by means of operations in order of adsorbing and fixing the fixed adsorption rods 55 to the wall surface A, actuating the vertically movable cylinders 53 for detachment of the robot traveling on the wall surface 1 from the wall surface A, and finally driving the drive gears 58.

It is apparent from the afore-mentioned description that the robot traveling on the wall according to the invention includes a pair of drive wheel and coupled follower wheel, opposite to each other, which are provided on one end side of the frame body with the specified distance left therebetween, another pair of drive wheel and coupled follower wheel, also opposite to each other, which are provided on another opposite end side of the frame body, while locating the drive wheel, as one element of the latter pair, at a position diagonally reversive to that of the drive wheel, as one element of the former pair, whereas the coupled follower wheel, as another resting element of the latter pair, is located reversively from the position of the coupled follower wheel, as another resting element of the former pair, in the same manner, and a plurality of movable adsorption discs mounted onto one unit of rotatable belt which is wound around the two pairs of drive wheels and coupled follower wheels for rotation, whereby a possibility of giving drive forces to the rotatable belt from both sides along which the two pairs of drive wheels and coupled follower wheels are located together with having the rotatable belt wound around them as mentioned above will assure a stable traveling of the robot.

A merit produced by the invention lies, first of all, in maximization of the adsorption force against the wall surface and extension of capability range of loading the robot with a lot of working instruments both of which originate from enlargement of the area of the overall face where a plurality of movable adsorption discs, fixed to the outer peripheral surface of the one unit of rotatable belt, become in contact with tile wall surface.

Further merit is to load the robot traveling on the wall with a lot of instruments, because a plurality of movable adsorption discs have the enclosure frame, made of flexible material, and each antislipping member which is, movable and forcibly approachable to a direction toward the wall and each 30 surface frame in a direction opposite to the wall surface against the urging force by means of sucking-in force of by the vacuum equipment, and the enclosure member results in being firmly adhered to the wall surface at the adsorption time in cooperation with its elasticity, the urging force helping each frictional surface to be in close contact with the wall surface and making rise in its frictional resistance at the same time so that the adsorption force is reinforced and the frictional resistance is enlarged.

Still further merit is to be easy to adsorb to the wall surface for each frictional surface of the antislipping member, by taking and just before the touch to the wall surface, a posture parallel with the wall surface.

We claim:

1. A robot traveling on a wall face comprising:
   a rectangular frame body;
   a pair of drive wheel and coupled follower wheel, which is provided on one end side of said frame body with a specified distance left therebetween;
   another pair of drive wheel and coupled follower wheel, which is on another opposite end side of said frame body with the specified distance left therebetween such that said drive wheel, as one element of the latter pair, is located at a position diagonally opposed to that of said drive wheel, as one element of the former pair, whereas said coupled follower wheel, as another resting element of the latter pair, is located at a position diagonally opposed to that of said coupled follower wheel, as another resting element of the former pair;
   one unit of rotatable belt which is wound around these two pairs of drive wheels and coupled follower wheels, so that said rotatable belt may be rotated;
   a plurality of movable adsorption discs fixed to an outer face of said rotatable belt;
   a suction pipe connecting said adsorption discs to vacuum equipment; and
   controllers, provided in the middle of pipings for said suction pipe, for making a connection with said vacuum equipment upon contact between said movable adsorption discs and said wall face and breaking said connection with said vacuum equipment upon detachment of said movable adsorption discs from said wall face.

2. A robot traveling on a wall face, as defined in claim 1, wherein said movable adsorption discs include:
   a mounting frame;
   an enclosure frame, made of elastic material, provided on said mounting frame;
   antislipping members which are, movable and forcibly approachable to said wall face, provided within said enclosure frame; and
   elastic means provided between said mounting frame and said antislipping members for urging said antislipping members toward said wall face so that a suction force from said vacuum equipment permits each frictional surface of said antislipping members to come into contact with said wall face and each antislipping member to be contracted together with said enclosure frame in a direction opposite to said wall face against an urging force of said elastic means.

3. A robot traveling on a wall face, as defined in claim 1, which further comprises hinge means for attaching said movable adsorption discs to said rotatable belt such that said movable adsorption discs are moved to and fro, which permits each frictional surface of antislipping members to take a posture where said frictional surface becomes parallel with said wall face just before its contact with said wall face.

4. A robot traveling on a wall face, as defined in claim 1, wherein said robot further comprises:
   a rotatable arm supported by said frame body,
   vertically movable cylinders provided on both ends of said rotatable arm,
   fixed adsorption rods fixed to said vertically movable cylinders respectively, and
   a second suction pipe for connecting said fixed adsorption rods to said vacuum equipment so that said adsorption rods are fixed to said wall face for permitting said robot to change its traveling direction with respect to said rotatable arm.

* * * * *